US 6,710,739 B1

United States Patent
Loegering

(10) Patent No.: US 6,710,739 B1
(45) Date of Patent: Mar. 23, 2004

(54) DUAL REDUNDANT GPS ANTI-JAM AIR VEHICLE NAVIGATION SYSTEM ARCHITECTURE AND METHOD

(75) Inventor: Gregory Scott Loegering, Del Mar, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/336,553

(22) Filed: Jan. 3, 2003

(51) Int. Cl.[7] ............................. G01S 5/14; H03D 1/06; H03K 5/01
(52) U.S. Cl. ................... 342/357.12; 375/346; 455/296
(58) Field of Search .................. 342/357.12, 383; 375/346; 455/296

(56) References Cited

U.S. PATENT DOCUMENTS

| | | |
|---|---|---|
| 5,184,304 A | 2/1993 | Huddle |
| 5,410,750 A | 4/1995 | Cantwell et al. |
| 5,543,804 A | 8/1996 | Buchler et al. |
| 5,592,178 A | 1/1997 | Chang et al. |
| 5,712,641 A | 1/1998 | Casabona et al. |
| 5,740,048 A | 4/1998 | Abel et al. |
| 5,808,582 A | 9/1998 | Woo |
| 5,822,429 A | 10/1998 | Casabona et al. |
| 5,872,540 A | 2/1999 | Casabona et al. |
| 5,936,571 A | 8/1999 | Desjardins |
| 5,955,987 A | 9/1999 | Murphy et al. |
| 5,999,126 A | 12/1999 | Ito |
| 6,067,333 A | 5/2000 | Kim et al. |
| 6,114,988 A | 9/2000 | Schipper et al. |
| 6,175,327 B1 | 1/2001 | Lin et al. |
| 6,219,390 B1 | 4/2001 | Prasanna |
| 6,311,127 B1 | 10/2001 | Stratton et al. |
| 6,347,113 B1 | 2/2002 | Hatch |
| 6,377,892 B1 | 4/2002 | Johnson et al. |
| 6,417,802 B1 | 7/2002 | Diesel |
| 6,448,925 B1 | 9/2002 | Shridhara |
| 6,480,151 B2 | 11/2002 | Maalouf et al. |
| 6,486,828 B1 * | 11/2002 | Cahn et al. .................. 342/363 |
| 2001/0020216 A1 | 9/2001 | Lin |
| 2002/0012411 A1 | 1/2002 | Heinzl et al. |
| 2002/0015456 A1 | 2/2002 | Norman et al. |
| 2002/0039082 A1 | 4/2002 | Fox et al. |
| 2002/0109628 A1 | 8/2002 | Diesel |
| 2002/0118133 A1 | 8/2002 | Desjardins |

FOREIGN PATENT DOCUMENTS

WO WO 01/50622 A1 * 7/2001 ........... H04B/1/707

OTHER PUBLICATIONS

Cagley, Richard et al, "A MUltistage Interference Suppression Rejection System for GPS," Conf Record of the 36th Asilomar Conference on Signals, Systems and Computers, Nov. 2002, pp. 1674–1679, vol. 2.*

(List continued on next page.)

*Primary Examiner*—Gregory C. Issing
(74) *Attorney, Agent, or Firm*—Robert P. Lenart, Esq.; Pietragallo, Bosick & Gordon

(57) ABSTRACT

A navigation system for an unmanned aerial vehicle, the navigation system comprising a first antenna for receiving a global positioning system signal, a first interference suppression unit coupled to the first antenna, the first interference suppression unit suppressing interference in the global positioning system signal using a first interference suppression technique, a first navigation unit for receiving signals from the first interference suppression unit, a second antenna for receiving the global positioning system signal, a second interference suppression unit coupled to the second antenna, the second interference suppression unit suppressing interference in the global positioning system signal using a second interference suppression technique, and a second navigation unit for receiving signals from the second interference suppression unit. A method for controlling the flight of an air vehicle performed by the apparatus is also included.

8 Claims, 2 Drawing Sheets

OTHER PUBLICATIONS

Magrabi, S.M et al, "Decentralized Fault Detection and Diagnosis in Navigation Systems for Unmanned Aerial Vehicles," IEEE 2000 PLANS, Mar. 2000, pp. 363–370.*

Zoltowski, Michael et al., "Advanced Adaptive Null Steering Concepts for GPS," IEE Conf. Record on Military Communications Conf, Nov. 1995, pp. 1214–1218, vol. 3.*

* cited by examiner

DUAL REDUNDANT GPS ANTI-JAM AIR VEHICLE NAVIGATION SYSTEM ARCHITECTURE AND METHOD

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to radio frequency (RF) systems used for navigational purposes, and, more particularly, to aircraft navigation systems that utilize Global Positioning System (GPS) signals and include anti-jam devices.

BACKGROUND OF THE INVENTION

Satellite navigation systems employ a plurality of satellites which generate respective signals for reception by an RF receiver on an airborne or surface vehicle, or other platform for computation of the platform position. A navigation control can thus steer the platform on the basis of a stream of position calculations. Well known satellite navigation systems include the Global Positioning System (GPS) and the Global Navigation Satellite System (GLONASS). As used herein, the term Global Position System or GPS refers generically to satellite navigation systems including the Global Position System, GLONASS, and any additional satellite navigation system which may be created in the future.

The Global Positioning System is a network of satellites that transmits information in signals, which when received and decoded, allow a receiver to accurately fix its position within a coverage area. The global positioning system (GPS) satellite navigation system provides a worldwide position, velocity and time reference available for utilization in electronic navigation systems. The utility of the Global Positioning System for guidance applications is well recognized.

Unfortunately, GPS guidance, which uses low power signals from satellites in an 11,000 nautical mile orbit, is notoriously easy to jam with low power, low cost jammers positioned at various locations. Since a large number of jamming units could be located in a given area, one by one elimination of the jammers may not be feasible. If only a few remain operational, they can effectively jam the GPS signals.

In addition, in an environment with strong RF fields, interference signals may have jamming effects on an RF receiver even though they are not intentionally generated as jamming signals. Jamming interference signals may originate, for example, from a radio or television tower, or any high frequency device such as a radar, a radio, or a cellular phone.

Accordingly, the term "jamming signal" as used herein refers to both jamming and interference signals. In addition, the term "jamming free" includes "interference-free", and the term "anti-jam capability" includes "anti-interference" capability.

Several measures have been suggested to provide an anti-jamming countermeasure for GPS guided vehicles. One measure involves the use of a nulling antenna system. In accordance with that approach, the vehicle is equipped with a number of antennas which point a null in the antenna radiation pattern at the source of the jamming signal. Though somewhat effective, this approach can be expensive as the number of jammers that can be nullified is one less than the number of antenna elements. Hence, that approach may not be practical if a large number of inexpensive jammers are used.

Other techniques have been proposed to address the problem of interfering signals that lie within the GPS bandwidth. One approach is to use an increased number of bits in the ADC (A/D converter) and rely on the correlation process to mitigate the impact of the jammer. This approach is based on the premise that the correlator will distinguish between the Gold code and a CW (tone), provided that the power level of the jammer is not so large as to send the ADC into a saturation mode. By increasing the dynamic range of the ADC (with the concurrent increase in number of bits) the effects of jamming signals can be reduced.

Another approach is one of "cancellation" rather than "removal." That is, a "replica" (or as close to a replica as is feasible) of the jamming signal is generated and is subtracted from the received signal. This cancellation method is of value when the jamming signal is indeed a very narrowband CW signal, essentially a pure tone. For wider applicability, multiple CW "replicas" can be generated and subtracted in the event that there are more than one jamming signals.

While an example of an anti-jam GPS navigation system is disclosed in U.S. Pat. No. 5,955,987, there is a need for a system and method for navigating air vehicles that provides improved resistance to jamming signals.

SUMMARY OF THE INVENTION

A navigation system for an unmanned aerial vehicle constructed in accordance with this invention comprises a first antenna for receiving a global positioning system signal, a first interference suppression unit coupled to the first antenna, the first interference suppression unit suppressing interference in the global positioning system signal using a first interference suppression technique, a first navigation unit for receiving signals from the first interference suppression unit, a second antenna for receiving the global positioning system signal, a second interference suppression unit coupled to the second antenna, the second interference suppression unit suppressing interference in the global positioning system signal using a second interference suppression technique, and a second navigation unit for receiving signals from the second interference suppression unit.

The system can further comprise a third navigation unit for receiving signals from the first interference suppression unit, and a fourth navigation unit for receiving signals from the second interference suppression unit.

The first interference suppression technique can comprise an antenna null steering technique, and the second interference suppression technique can comprise a wavefront polarization difference technique.

The first antenna can comprise a controlled radiation pattern antenna.

The invention also encompasses a method for controlling the flight of an air vehicle, the method comprising the steps of using a first antenna to receive a global positioning system signal, suppressing interference in the global positioning system signal using a first interference suppression technique to produce a first interference suppressed global positioning system signal, operating a first navigation unit in accordance with the first interference suppressed global positioning system signal, using a second antenna for receiving the global positioning system signal, suppressing interference in the global positioning system signal using a second interference suppression technique to produce a second interference suppressed global positioning system signal, operating a second navigation unit in accordance with the second interference suppressed global positioning system signal, and using at least one of the first and second navigation units to control the flight of the air vehicle.

The method can further comprise the steps of operating a third navigation unit in accordance with the first interference suppressed global positioning system signal, operating a fourth navigation unit in accordance with the second interference suppressed global positioning system signal, and using at least one of the first, second, third or fourth navigation units to control the flight of the air vehicle.

The first interference suppression technique can comprise an antenna null steering technique, and the second interference suppression technique can comprise a wavefront polarization difference technique.

The first antenna can comprise a controlled radiation pattern antenna.

DETAILED DESCRIPTION OF THE INVENTION

Figure 1:
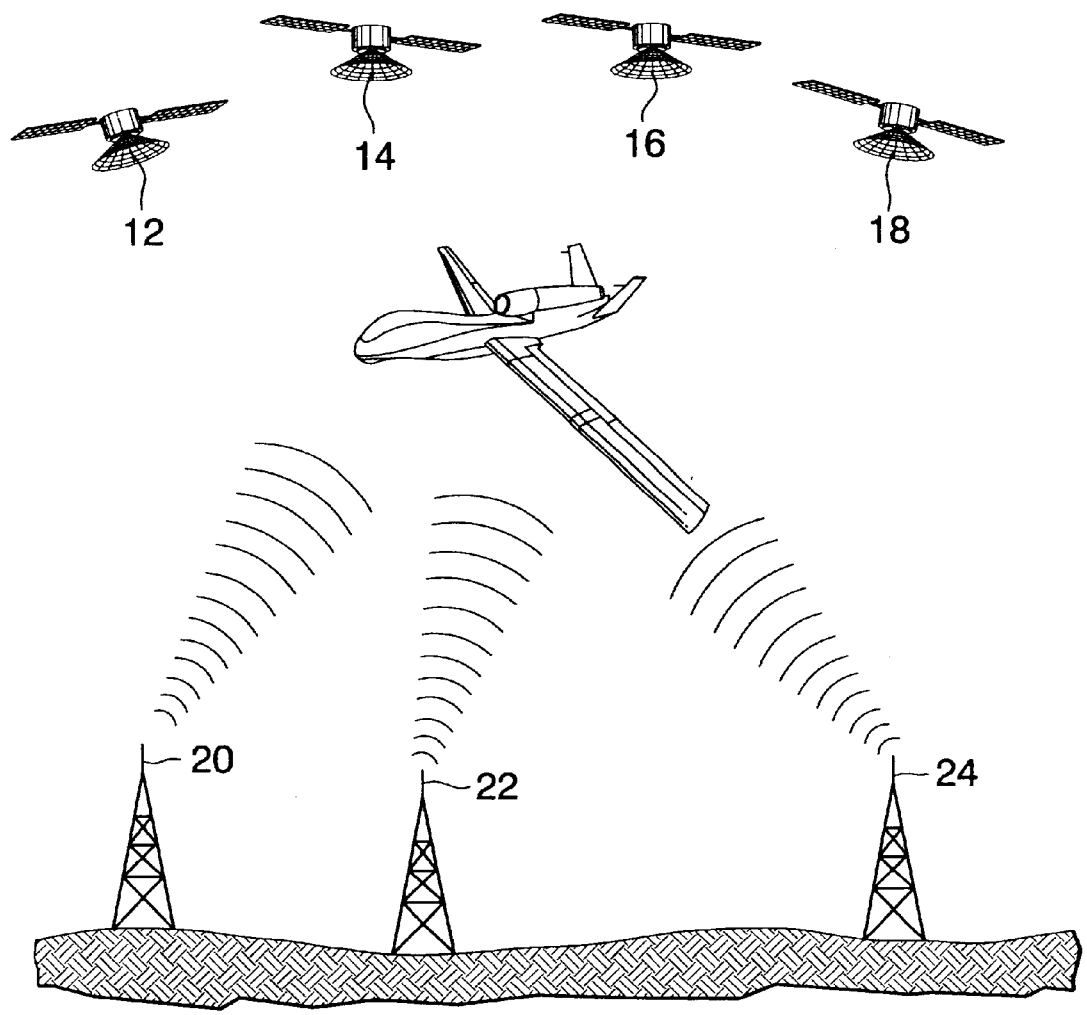
FIG. 1 is a schematic representation of an air vehicle in combination with a global positioning system and sources of jamming signals.

Referring to the drawings, FIG. 1 is a schematic representation of an air vehicle 10 in combination with a global positioning system (GPS) and sources of jamming signals. The global positioning system includes a plurality of satellites 12, 14, 16 and 18 orbiting the earth in a known pattern and transmitting global positioning system signals in accordance with known techniques. The air vehicle includes two antennas for receiving global positioning signals from the satellites. The air vehicle includes at least two on-board navigation systems. The on-board navigation systems use the GPS signals to control the flight of the air vehicle in accordance with known techniques. A plurality of jamming signal sources 20, 22 and 24 are shown to be located at separate positions on the ground. While ground-based jamming sources are illustrated in FIG. 1, it should be understood that the jamming signals can be provided by sources that are not located on the ground.

The jamming signal sources can provide various types of jamming signals in an attempt to disrupt the navigation of the air vehicle. Anti-jamming devices have been developed to permit operation of the GPS navigation system in the presence of jamming signals. The present invention utilizes these anti-jamming devices in a new way to provide improved protection against jamming signals.

Figure 2:
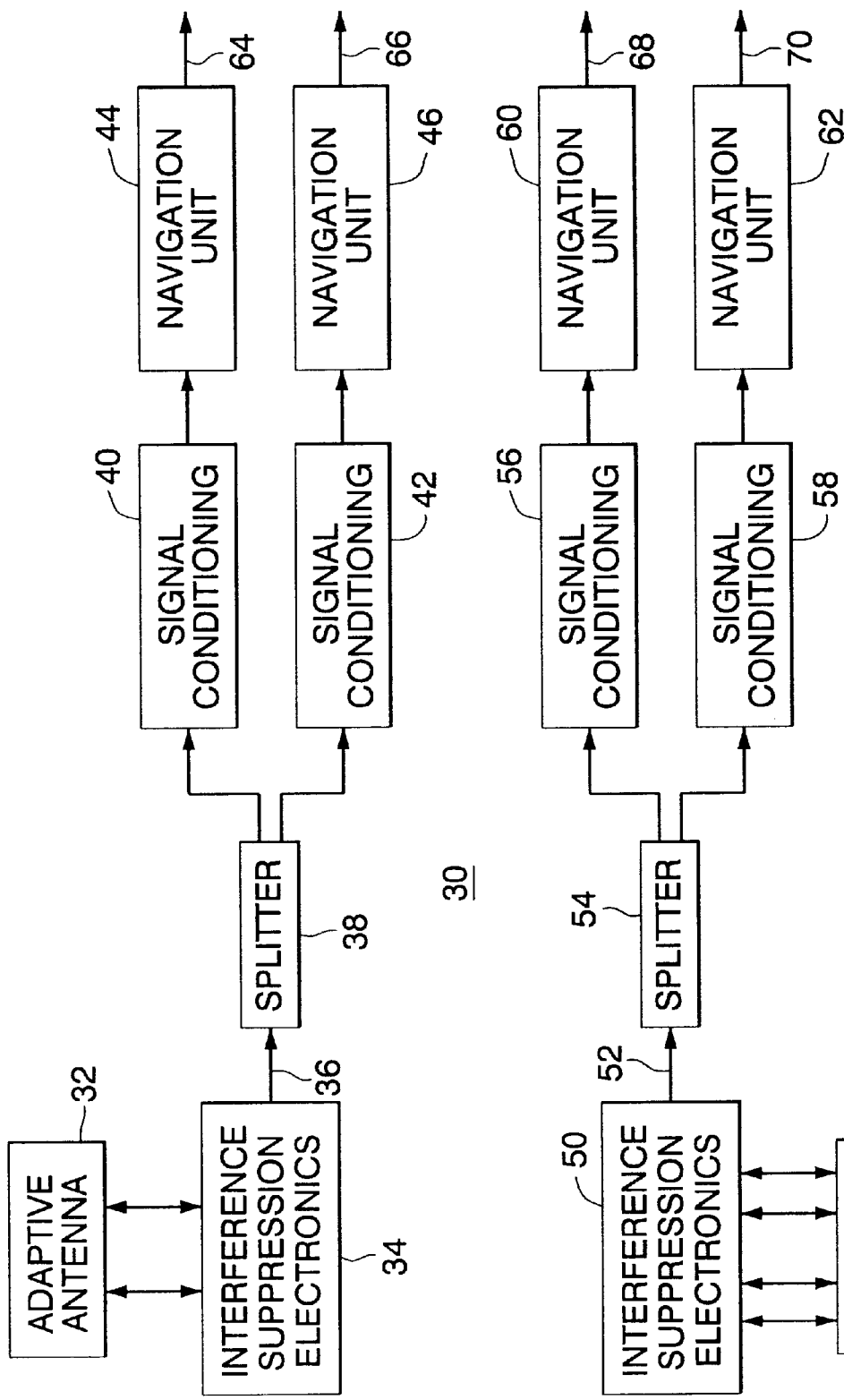
FIG. 2 is a simplified functional block diagram of an air vehicle navigation system constructed in accordance with this invention.

FIG. 2 is a simplified functional block diagram of an air vehicle navigation system 30 constructed in accordance with this invention. In avionics navigation and control systems, it is highly desirable to incorporate redundancy in order to provide integrity and control of the airplane. The system of FIG. 2 includes a first antenna 32 for receiving GPS signals. The first antenna is coupled to a first interference suppression unit 34 coupled to the first antenna. The first interference suppression unit suppresses interference in the global positioning system signal using a first interference suppression technique to suppress signals provided by the jamming sources. The first interference suppression unit produces an output on line 36 that is divided by splitter 38 and conditioned by signal conditioning devices 40 and 42. The signal conditioning devices can include, for example, well known filters, preamplifiers, and attenuators as required for each of the navigation units 44 and 46.

A second antenna 48 is also provided for receiving the global positioning system signals. The second antenna is coupled to a second interference suppression unit 50. The second interference suppression unit suppresses interference in the global positioning system signal using a second interference suppression technique. The second interference suppression unit produces an output on line 52 that is divided by a second splitter 54 and conditioned by signal conditioning devices 56 and 58. The signal conditioning devices can include, for example, well known filters, preamplifiers, and attenuators as required for each of the navigation units 60 and 62.

The navigation units 44, 46, 60 and 62 produce control signals, as illustrated by arrows 64, 66, 68 and 70, that are used to control the flight of the air vehicle in accordance with known techniques.

The interference suppression units can be constructed in accordance with existing techniques, and can include, for example, units that utilize an antenna null steering technique, a wavefront polarization difference technique, an interference signal cancellation technique, an adaptive temporal filtering technique, an aided narrow-band tracking filter technique or other signal processing techniques. One technique might be preferable over another depending upon the anticipated jamming and interference environment. By using two different interference suppression techniques, the system and method of this invention decreases the likelihood of a jamming signal preventing access to the GPS signals over systems that include redundant similar components with identical interference suppression techniques.

The navigation units used in the navigation system of this invention can be, for example, Kearfott KN-4072 INS/GPS units, and/or Litton LN-100G INS/GPS units. These units operate using both inertial navigation and global positioning system navigation. The interference suppression units can be, for example, the Electro-Radiation ISU/LRU-2000L1 unit, and/or the Raytheon Systems GAS-1N unit. Each pair of navigation units is fed from a separate GPS antenna. The systems and method of this invention utilize the principle of dissimilar redundancy. On the air vehicle, the anti-jam navigation systems of this invention use an architecture that includes a different type of GPS anti-jamming technology on each GPS antenna feed. In one embodiment of the invention, the interference suppression unit for one pair of navigation units can be a Raytheon GAS-IN system and the interference suppression unit for the other pair of navigation units can be an ERI ISU/LRU-2000L1 interference suppression unit. The air vehicle flight control computer utilizes information from the navigation unit's Kalman filters to determine which solution to utilize for navigation purposes, and is based on using the output of the system with the best estimate of its position error.

The combination of two anti-jam systems provides the air vehicle with protection from jamming sources using different techniques, thus providing greater protection than would be afforded using one of the other anti-jamming system alone.

While the present invention has been described in terms of its presently preferred embodiments, it will be apparent to those skilled in the art that various changes can be made to the disclosed embodiments without departing from the scope of the invention as defined by the following claims.

What is claimed is:

1. A navigation system for an unmanned aerial vehicle, the navigation system comprising:
    a first antenna for receiving a global positioning system signal;
    a first interference suppression unit coupled to the first antenna, the first interference suppression unit suppressing interference in the global positioning system signal using a first interference suppression technique;
    a first navigation unit for receiving signals from the first interference suppression unit;
    a second antenna for receiving the global positioning system signal;
    a second interference suppression unit coupled to the second antenna, the second interference suppression unit suppressing interference in the global positioning system signal using a second interference suppression technique; and
    a second navigation unit for receiving signals from the second interference suppression unit.

2. The system of claim 1, further comprising:
    a third navigation unit for receiving signals from the first interference suppression unit; and
    a fourth navigation unit for receiving signals from the second interference suppression unit.

3. The system of claim 1, wherein:
    the first interference suppression technique comprises an antenna null steering technique; and
    the second interference suppression technique comprises a wavefront polarization difference technique.

4. The system of claim 1, wherein:
    the first antenna comprises a controlled radiation pattern antenna.

5. A method for controlling flight of an air vehicle, the method comprising the steps of:
    using a first antenna to receive a global positioning system signal;
    suppressing interference in the global positioning system signal using a first interference suppression technique to produce a first interference suppressed global positioning system signal;
    operating a first navigation unit in accordance with the first interference suppressed global positioning system signal;
    using a second antenna for receiving the global positioning system signal;
    suppressing interference in the global positioning system signal using a second interference suppression technique to produce a second interference suppressed global positioning system signal;
    operating a second navigation unit in accordance with the first interference suppressed global positioning system signal; and
    using at least one of the first and second navigation units to control the flight of the air vehicle.

6. The method of claim 5, further comprising the steps of:
    operating a third navigation unit in accordance with the first interference suppressed global positioning system signal; and
    operating a fourth navigation unit in accordance with the second interference suppressed global positioning system signal; and
    using at least one of the first, second, third or fourth navigation units to control the flight of the air vehicle.

7. The method of claim 5, wherein:
    the first interference suppression technique comprises an antenna null steering technique; and
    the second interference suppression technique comprises a wavefront polarization difference technique.

8. The method of claim 5, wherein:
    the first antenna comprises a controlled radiation pattern antenna.

* * * * *